(12) United States Patent
Sun

(10) Patent No.: US 6,725,102 B2
(45) Date of Patent: Apr. 20, 2004

(54) AUTOMATIC OPERATION SYSTEM AND A METHOD OF OPERATING THE SAME

(75) Inventor: Chun-I Sun, Taipei Hsien (TW)

(73) Assignee: Kinpo Electronics Inc., Taipei (TW)

( * ) Notice: Subject to any disclaimer, the term of this patent is extended or adjusted under 35 U.S.C. 154(b) by 501 days.

(21) Appl. No.: 09/782,018

(22) Filed: Feb. 14, 2001

(65) Prior Publication Data

US 2002/0151991 A1 Oct. 17, 2002

(51) Int. Cl.[7] .............................................. G05B 13/02
(52) U.S. Cl. ............................. 700/51; 700/19; 700/20; 700/49; 700/23; 702/179; 702/180; 702/181
(58) Field of Search .............................. 700/17, 18, 23, 700/32, 19–20, 50–51, 83, 86, 87, 88, 89, 90; 702/179–181; 709/201, 202, 217–220

(56) References Cited

U.S. PATENT DOCUMENTS

| 4,407,447 | A | * | 10/1983 | Sayegh ....................... 236/49.3 |
| 5,400,246 | A | * | 3/1995 | Wilson et al. ................. 700/17 |
| 5,519,618 | A | * | 5/1996 | Kastner et al. ............. 701/120 |
| 5,572,438 | A | * | 11/1996 | Ehlers et al. ................ 700/295 |
| 5,706,191 | A | * | 1/1998 | Bassett et al. .................. 700/9 |
| 5,815,086 | A | * | 9/1998 | Ivie et al. ............. 340/825.52 |
| 5,905,523 | A | * | 5/1999 | Woodfield et al. ............. 725/99 |
| 6,003,131 | A | * | 12/1999 | Lee et al. ....................... 713/2 |
| 6,016,344 | A | * | 1/2000 | Katz .......................... 379/260 |
| 6,446,076 | B1 | * | 9/2002 | Burkey et al. .............. 707/102 |
| 6,453,687 | B2 | * | 9/2002 | Sharood et al. ................ 62/127 |

\* cited by examiner

*Primary Examiner*—Ramesh Patel
(74) *Attorney, Agent, or Firm*—Troxell Law Office PLLC

(57) ABSTRACT

An automatic operation system provides a CPU to detect and record a status of operation for the operated mechanism. As soon as a response is to be output for allowing the operated mechanism to perform a operation, the CPU figures out corresponding responses by way of a statistic analysis based on past record of operation status as a reference for the operator. Thus, an operation is simplified or a response is output automatically so as to allow the operated mechanism processing itself.

20 Claims, 3 Drawing Sheets

AUTOMATIC OPERATION SYSTEM AND A METHOD OF OPERATING THE SAME

BACKGROUND OF THE INVENTION

1. Field of the Invention

The present invention relates to an automatic operation system, and particularly to an operation system, which can offer an operator suggestion information during making a response or perform proper a response automatically to simplify the operation or save manual work.

2. Description of Related Art

A conventional telephone set usually provides a design of redialing such that a redial button is utilized for being able to redial the last telephone number dialed before. When the television is turned on by way of a remote controller, the picture on a television screen is belonged to the channel watched last time during the television was turned off. Furthermore, an elevator always stops at the same floor while in a state of idling. The preceding examples explain a fact that the response of conventional control is unable to offer an optimum response as desired. For instance, a clerk has to report to his boss with regard to the business matter at 9 o'clock every morning, and it is not possible for the telephone to dial his boss's phone number automatically at the time of the receiver of telephone set being picked up. It is not possible to switch over to a specific channel automatically while the television is turned on by way of remote controller at 7:00 PM for watching a favorite news report in the specific channel. The staff at $6^{th}$ floor go off work at 5:00 PM and the elevator is unable to stop on the $6^{th}$ floor at 5:00 PM automatically while it is in a state of idling.

The present invention has improved the monotonous control of response provided by the prior art.

SUMMARY OF THE INVENTION

A major object of the present invention is to provide an automatic operation system, which offers proper response information or perform proper responses automatically depending on the need via the record of past operations.

Other objects and features of the present invention will be apparent by way of following description of embodiments with accompanying drawings.

DETAILED DESCRIPTION OF THE PREFERRED EMBODIMENTS

Figure 1:
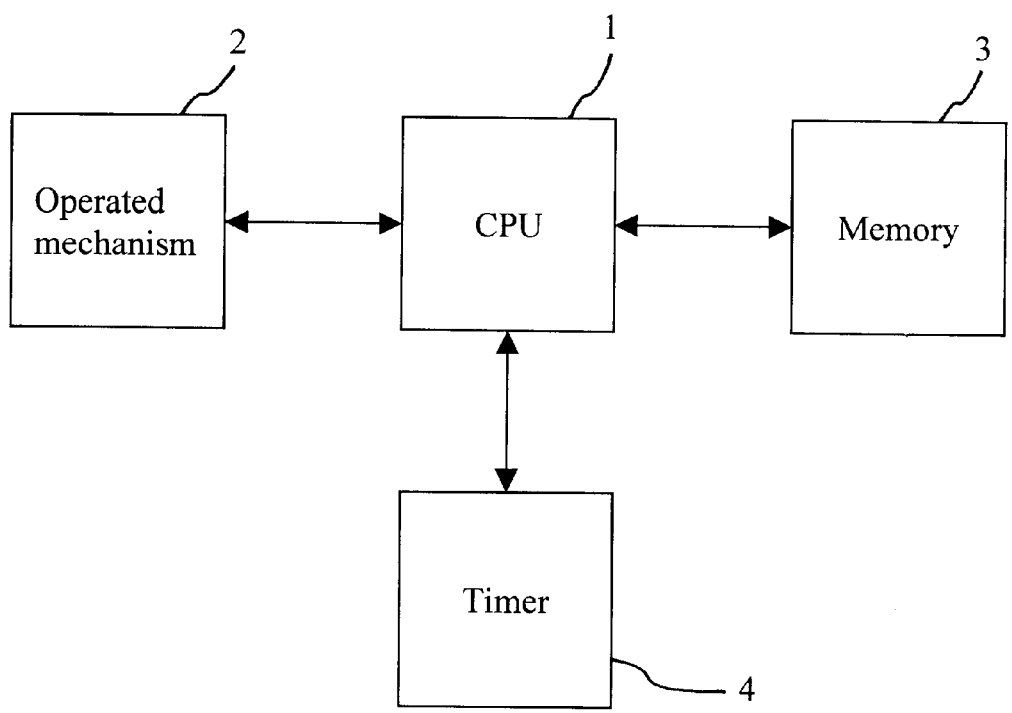
FIG. 1 is a block diagram of system structure in an automatic operation system according to the present invention.

Referring to FIG. 1, the system structure in an automatic operation system according to the present invention comprises a CPU 1, an operated mechanism 2, a memory 3 and a timer 4, and the CPU 1 links the operated mechanism 2, the memory 3 and the timer 4 respectively. Wherein, the operated mechanism 2 may be a video telephone, a screen phone, a phone with a display, a radio, a PC (computer), a television, an elevator, an automobile, and a control console for airplanes. The CPU 1 can be disposed in the operated mechanism 2.

The CPU 1 provided in the present invention is utilized to record various operation states of the operated mechanism 2 so as to be stored in the memory 3. While the operated mechanism 2 is actuated to perform some operation, the CPU 1 proceeds statistic analysis for the record in the memory 3 and figures out the proper correspondent choice to send out to the operated mechanism 2. In this way, the operated mechanism 2 can operate automatically based on the optimum mode of operation or provides the operator a correspondent choice for the optimum mode of operation as a reference during operation.

Various statistic analyses of operation conditions for the operated mechanism 2 and operation modes of the present invention will be explained by way of following embodiments:

Embodiment 1 A statistic Analysis for Probability of Response Occurrence

A building with ten floors provides a control signal to link with the CPU and the control signal is used for calling an elevator disposed at any one of these ten floors. As soon as the elevator at any floor is called, the calling message is learned by the CPU and is store in the memory. For example: The frequencies of the elevator being called at all floors in a period from the morning till the afternoon are listed hereinafter:

| Floor | 1 | 2 | 3 | 4 | 5 | 6 | 7 | 8 | 9 | 10 |
|---|---|---|---|---|---|---|---|---|---|---|
| Morning Frequency | 50 | 4 | 6 | 14 | 12 | 20 | 13 | 11 | 15 | 12 |
| Afternoon Frequency | 15 | 3 | 7 | 11 | 10 | 45 | 9 | 8 | 12 | 10 |

From the statistic results, the most frequency of the elevator being called is at the $1^{st}$ floor in the morning (50 times) and the most frequency of the elevator being called is at $6^{th}$ floor in the afternoon (45 times). It means the frequency of the elevator being used at $6^{th}$ floor is higher than that at $1^{st}$ floor (15 times) in the afternoon. Hence, the CPU can control the elevator to stop at $1^{st}$ floor while not in use (idling) in the morning and to stop at $6^{th}$ floor while not in use in the afternoon so as to facilitate the elevator being used at the right floor with highest rate of using. For instance, the elevator will move down to the $6^{th}$ floor in a state of idling after reaching $10^{th}$ floor instead of moving down to $1^{st}$ floor during the afternoon. In this way, the elevator can pick up passengers on the $6^{th}$ floor directly without the need of moving upward from the $1^{st}$ floor. Thus, the present invention can not only allow the passengers to save the waiting time for the elevator but also decrease ineffective route the elevator has to move for saving electricity consumption.

Embodiment 2 Statistic Analysis of Time and the Probability of Response Occurrence The information regarding the time of a television being turned on and the status of channel being switched over can be sent to the CPU and can be saved in the memory. For instance, the status of channel being switched over in a period of five consecutive days is recorded in the following:

| channel | A | B | C |
| --- | --- | --- | --- |
| 1st day | 7:00 PM~7:59 PM | 8:00 PM~9:10 PM | 10:00 PM~11:30 PM |
| 2nd day | 7:00 PM~7:30 PM | 11:00 PM~11:30 PM | 9:00 PM~10:30 PM |
| 3rd day | 9:00 PM~10:30 PM | 7:00 PM~8:30 PM | 11:00 PM~12:00 PM |
| 4th day | | 8:00 PM~9:30 PM | 7:00 PM~7:30 PM |
| 5th day | 7:00 PM~8:10 PM | 10:00 PM~10:30 PM | 11:00 PM~11:30 PM |

From the statistic analysis of time and the probability of response, following results can be obtained:

| Time | 7:00 PM | 8:00 PM | 9:00 PM | 10:00 PM | 11:00 PM |
| --- | --- | --- | --- | --- | --- |
| Channel A | 3 times | 1 time | 1 time | 1 time | 0 time |
| Channel B | 1 time | 3 times | 2 times | 1 time | 1 time |
| Channel C | 1 time | 0 time | 1 time | 2 times | 3 times |

It can be understood that channel A is watched the most (3 times) at 7:00 PM, channel B is watched the most (3 times) at 8:00 PM, and channel C is watched the most (2 times and 3 times) at 10:00 PM and 11:00 PM. The CPU can be set automatically to turn on the television at 7:00 PM and choose channel A, at 8:00 PM and choose channel B, and at 7:00 PM and choose channel A, respectively, through the statistic analysis of time and the probability of response. In this way, it may facilitate the user very much.

Embodiment 3 Analysis of Inverse Operation

Once a suggestion of optimum response offered by the automatic response system keeps denied by the operator, the system will deduct the statistic value proportionally. For instance, the television being turned on at 8:00 PM should switch over to channel B according to the statistic data in embodiment 2, but, it is kept to switch over to channel A for n times continuously (probably the program on channel B has been changed to channel A). At this time, the accumulated value of time and probability of response occurrence will be revised as following:

Frequency of channel A=1 time+1 time×n;

Frequency of channel B=3 times−1 time×n;

If n=3; frequency of channel A=3 times; frequency of channel B=1 time.

After the analysis of inverse operation, the channel B being switched on once again may result in the program on channel A will show up automatically.

Figure 2:
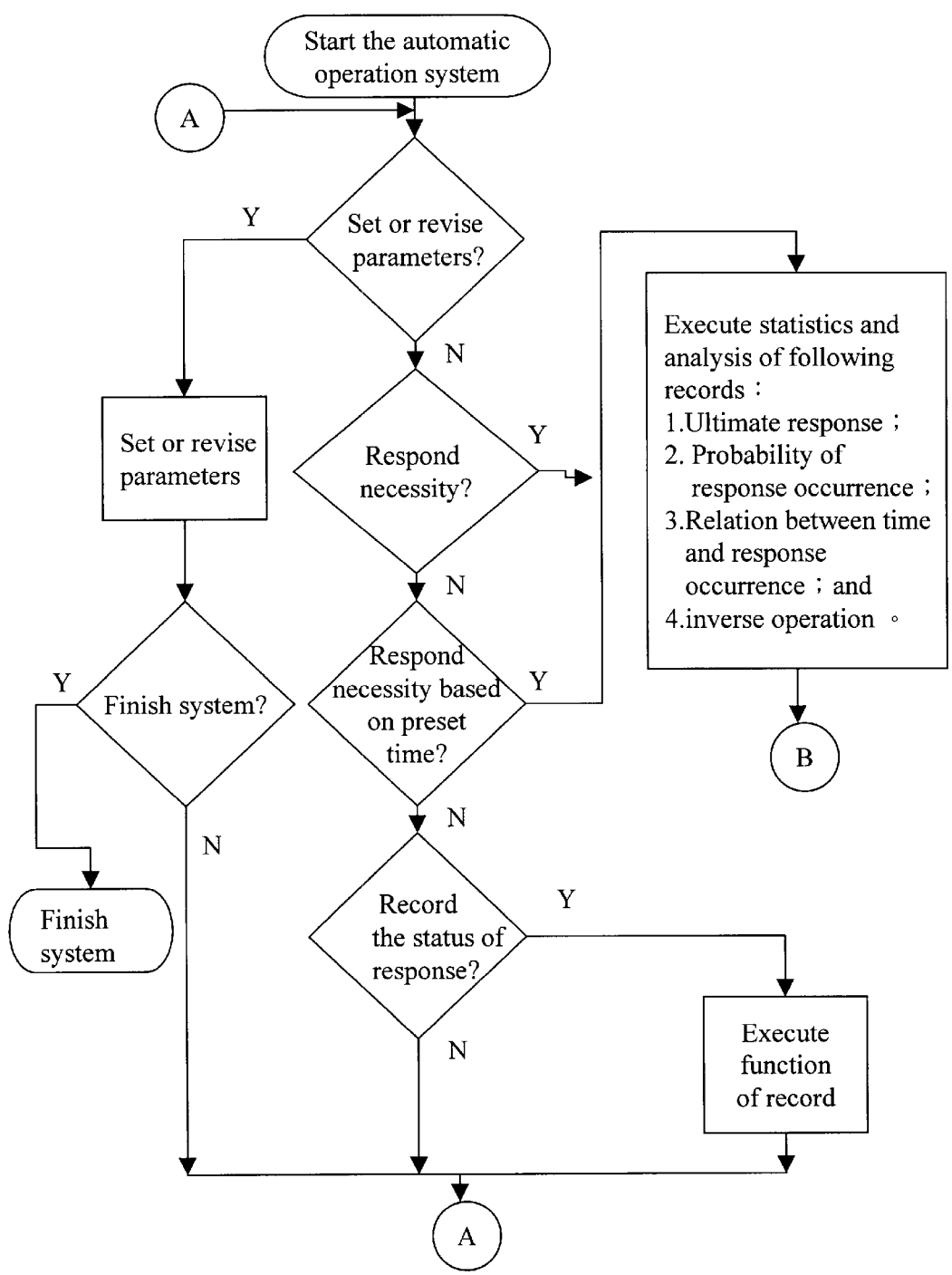
FIG. 2 is a flow chart of main program in the automatic operation system of the present invention.
Figure 3:
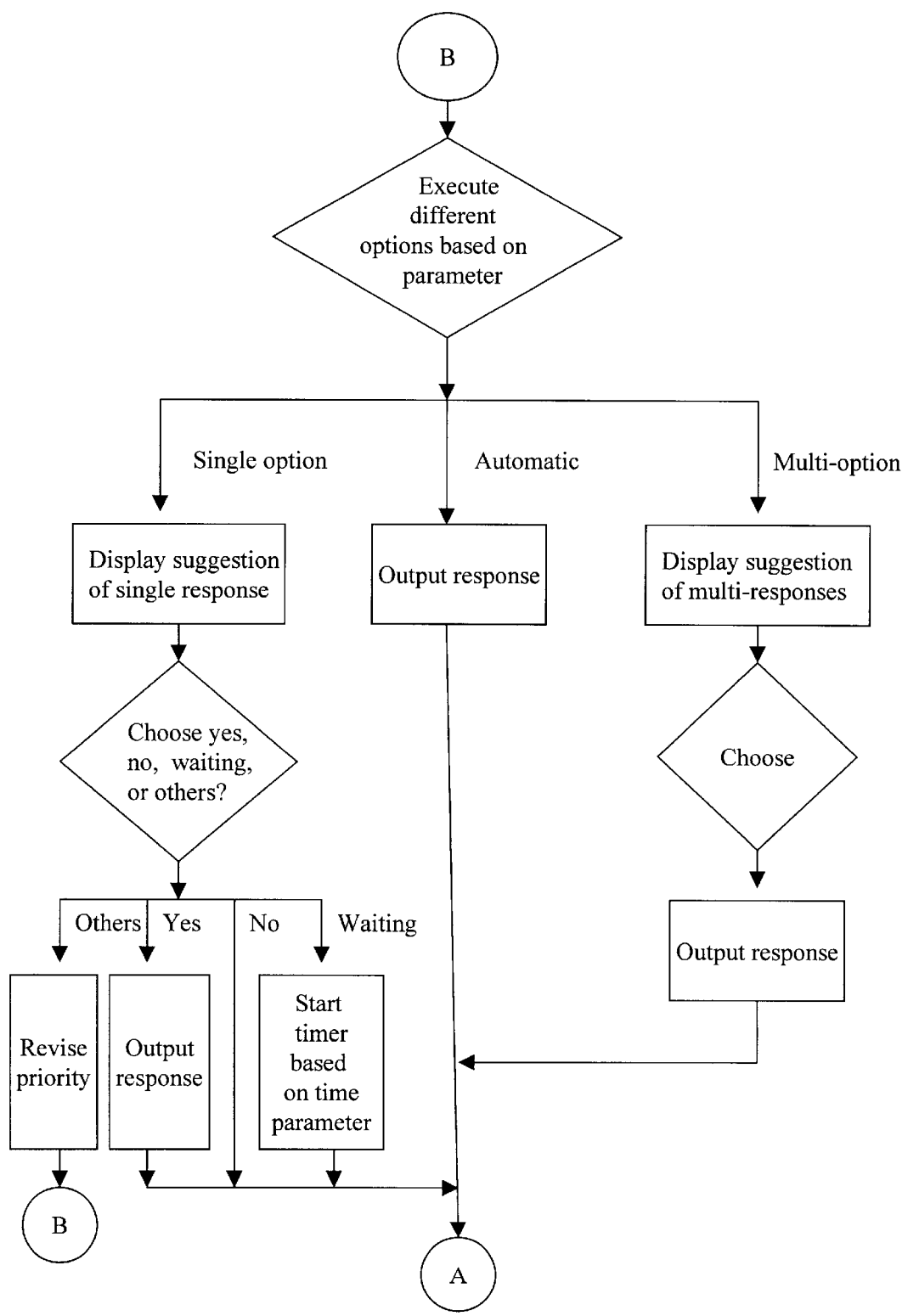
FIG. 3 is a flow chart of subroutine in the automatic operation system.

Referring to FIGS. 2 and 3, flow charts of the operation according to the present invention are illustrated. Take a videophone as an example hereinafter. After the automatic operation system is started, CPU begins to detect if the operator has defined or revised the parameters (such as displaying the telephone numbers or dialing the priority phone number)? If it is YES, revising or defining the parameters directly. Then, the CPU checks if there is any instruction for finishing the operation system? If it is YES, finishing the operation system and if it is NO, moves back to nodal point A and checks if the parameters have been revised or defined? If it is NO, checks if there is response necessity (such as the operator making a phone call or receiving a phone call)? If it is NO, checks if there is response necessity based on preset time (such as making some phone call at preset time). If it is NO, checks if it is required to record the status of response (such as resetting the parameters or making some call at a certain time)? If it is YES, performs the response record of operated mechanism. Then, moves back to the nodal point afterward. If it is not necessary to record the status of response, moves back to the nodal point either. If there is a necessity of response needed or a necessity of response based on time needed, the CPU then performs the statistic analysis from past records. For instance, 1. An ultimate response (dialing the phone at very last);
2. The probability of response occurrence (the phone is often dialed);
3. Time with respect to the probability of response occurrence (The phone number is often dialed at 9:00 AM);
4. The inverse operation (The CPU suggests to dial phone number "A" based on statistics, but the operator dials phone number "B").

The CPU then enter nodal point B to execute the subroutine after displaying suggestions through preceding statistic analysis, and performs different options based on parameters (such as displaying multiple sets of phone numbers). These options include:

1. Displays single response suggestion (such as displaying a dialed phone number) and checks if instruction of YES, NO, WAITING, or OTHER having been chosen. The processing routes thereof are as follow respectively:
   (1) According to the instruction of OTHER, the priority is revised (For instance, the priority of phone number "A" being over phone number "B" is changed to "B" being over "A"). Then, moves back to the nodal point B.
   (2) According to the instruction of YES, the response output is executed (such as dial a phone number). Then, moves back to nodal point A.
   (3) According to instruction of NO (such as not dialing a phone number suggested by the CPU), moves back to nodal point A.
   (4) According to the instruction of WAITING (such as dialing the phone number suggested by the CPU after 3 minutes), an execution is performed to start the timer based on the parameter of time. Then, moves back to nodal point A.
2. After responding the output automatically (such as dialing the phone number suggested by the CPU), then moves back to the nodal point A.
3. After displaying multiple response suggestions (such as multiple phone numbers suggested by the CPU, or options of YES, NO or WAITING), the CPU checks the selective instruction (such as dialing a certain phone number) and executes the response output (such as having the telephone set dial the telephone number) of selective instruction. Then, moves back to nodal point A.

From preceding description of embodiments, the present invention can be applied to many fields such as the control console of airplane, other executed programs for a booted personal computer, automatic suggestion for turning on or off the car lights on a car, the air conditioner and the stereo, automatic suggestion of radio channels after turning on the stereo, etc.

Accordingly, the present invention is possible to allow an operated mechanism running in a state of optimum mode of operation automatically or offer the operator a suggestion of optimum mode of operation. Therefore, the operated mechanism can execute the operation much more effectively and economically.

While the invention has been described with reference to preferred embodiments thereof, it is to be understood that modifications or variations may be easily made without departing from the spirit of this invention, which is defined by the appended claims.

What is claimed is:

1. An automatic operation system comprising:
   a) an operated mechanism;
   b) a memory; and
   c) a CPU electrically connected to the operated system and the memory, wherein the CPU detects a status of operation for the operated mechanism and the memory records the status of operation for the operated mechanism in memory to develop an operation record, the CPU performing a statistical analysis function on the operation record, developing a response based on the statistical analysis function, and sending the response to the operated system, the response being selected from the group of responses consisting of a reference for the operator and an output to the operated system to generate a predetermined operation by the operated system.

2. The automatic operation system according to claim 1, further comprising a timer electrically connected to the CPU and controlling the response to occur at a pre-determined time.

3. The automatic operation system according to claim 2, wherein the operated system is selected from a group of systems consisting of a video phone, a screen phone, a phone with a display, a radio, a computer, and a television.

4. The automatic operation system according to claim 2, wherein the operated system is an elevator.

5. The automatic operation system according to claim 2, wherein the CPU and memory are connected to the operated system.

6. The automatic operation system according to claim 1, wherein the statistical analysis function includes a probability of response occurrence function to determine at least one of the following: a relationship between time and the probability of response occurrence, and a statistical analysis of inverse operation.

7. The automatic operation system according to claim 6, further comprising a timer electrically connected to the CPU and controlling the response to occur at a pre-determined time.

8. The automatic operation system according to claim 7, wherein the operated system is selected from a group of systems consisting of a video phone, a screen phone, a phone with a display, a radio, a computer, and a television.

9. The automatic operation system according to claim 7, wherein the operated system is an elevator.

10. The automatic operation system according to claim 7, wherein the CPU and memory are connected to the operated system.

11. A method of operating an automatic operation system, which comprises the steps of:
    a) detecting a status of operation of an operated mechanism using a CPU;
    b) recording the status of operation of the operated mechanism in a memory electrically connected to the CPU to develop an operation record;
    c) performing a statistical analysis function on the operation record using the CPU;
    d) developing a response based on the statistical analysis function using the CPU;
    e) sending the response based on the statistical analysis function to the operated system; and
    f) performing a corresponding mode of operation by the operated system based upon the response generated by the CPU.

12. The method according to claim 11, wherein the developing step d) includes developing a response selected from the group of responses consisting of a reference for the operator and an output to the operated system to generate a predetermined operation by the operated system.

13. The method according to claim 12, wherein the performing step f) includes performing a corresponding mode of operation selected from the group consisting of a response set by an operator and a response automatically set as a result of the statistical analysis function performed by the CPU base on pre-determined parameters.

14. The method according to claim 13, wherein the operated system is selected from a group of systems consisting of a video phone, a screen phone, a phone with a display, a radio, a computer, and a television.

15. The method according to claim 13, wherein the operated system is an elevator.

16. The method according to claim 11, wherein the step of performing c) includes a probability of response occurrence function to determine at least one of the following: a relationship between time and the probability of response occurrence, and a statistical analysis of inverse operation.

17. The method according to claim 16, wherein the developing step d) includes developing a response selected from the group of responses consisting of a reference for the operator and an output to the operated system to generate a predetermined operation by the operated system.

18. The method according to claim 17, wherein the performing step f) includes performing a corresponding mode of operation selected from the group consisting of a response set by an operator and a response automatically set as a result of the statistical analysis function performed by the CPU base on pre-determined parameters.

19. The method according to claim 18, wherein the operated system is selected from a group of systems consisting of a video phone, a screen phone, a phone with a display, a radio, a computer, and a television.

20. The method according to claim 18, wherein the operated system is an elevator.

* * * * *